US009031598B2

(12) United States Patent
Pai et al.

(10) Patent No.: US 9,031,598 B2
(45) Date of Patent: May 12, 2015

(54) METHOD AND APPARATUS FOR PROVIDING SESSION INITIATOR PRIVILEGE, PRIORITY AND PRESENCE NOTIFICATION FOR PUSH-TO-TALK CHAT GROUP COMMUNICATIONS

(75) Inventors: Madhusudan K. Pai, Bangalore (IN); Ilya Freytsis, Swampscott, MA (US); Dominic Lazara, Park Ridge, IL (US); Udaya Shankara P.S., Bangalore (IN); Shrinivas Shetti, Sirsi (IN); Luqing Wang, Keller, TX (US)

(73) Assignee: Motorola Solutions, Inc., Schaumburg, IL (US)

( * ) Notice: Subject to any disclaimer, the term of this patent is extended or adjusted under 35 U.S.C. 154(b) by 393 days.

(21) Appl. No.: 13/332,920

(22) Filed: Dec. 21, 2011

(65) Prior Publication Data

US 2013/0165171 A1 Jun. 27, 2013

(51) Int. Cl.
*H04M 3/00* (2006.01)
*H04B 7/00* (2006.01)
*H04W 4/00* (2009.01)
*H04W 76/00* (2009.01)
*H04M 3/42* (2006.01)
*H04L 12/18* (2006.01)
*H04L 29/08* (2006.01)

(52) U.S. Cl.
CPC ......... *H04W 76/005* (2013.01); *H04L 12/1818* (2013.01); *H04M 3/42374* (2013.01); *H04L 67/24* (2013.01)

(58) Field of Classification Search
CPC ... H03W 76/005; H04L 65/4061; H04W 4/10

USPC .......................................... 455/517, 518, 519
See application file for complete search history.

(56) References Cited

U.S. PATENT DOCUMENTS

| 7,801,953 | B1 * | 9/2010 | Denman et al. ............... 709/204 |
| 7,826,603 | B1 * | 11/2010 | Denman et al. ........... 379/202.01 |
| 7,860,524 | B2 * | 12/2010 | Laible et al. .................. 455/518 |
| 8,285,785 | B2 * | 10/2012 | Ekholm et al. ............... 709/204 |
| 8,428,237 | B1 * | 4/2013 | Denman et al. .......... 379/202.01 |
| 8,447,341 | B2 * | 5/2013 | Denman et al. ............... 455/518 |
| 8,694,041 | B2 * | 4/2014 | Denman et al. ............... 455/518 |
| 2004/0032439 | A1 * | 2/2004 | Silverbrook .................... 347/13 |
| 2004/0042438 | A1 | 3/2004 | Jiang et al. |
| 2005/0169223 | A1 * | 8/2005 | Crocker et al. ............... 370/342 |

(Continued)

OTHER PUBLICATIONS

PCT International Search Report Dated Apr. 4, 2013 for Counterpart Application PCT/US2012/069644.

(Continued)

*Primary Examiner* — Tilahun B Gesesse
(74) *Attorney, Agent, or Firm* — Steven A. May

(57) ABSTRACT

A method for providing presence notification for PTT chat group communications includes a server receiving, from a communication device of a member of a chat group, a session initiation message to start a session for the PTT chat group. The session initiation message includes a member-selected priority. The server generates an event notification message that includes an indication that the chat group is active and has been assigned a priority, and sends the event notification message to communication devices of at least some of the other chat group members. Additionally, where a group priority has been assigned to the chat group, the group priority is assigned to the session. Otherwise, the member-selected priority is assigned to the session.

19 Claims, 6 Drawing Sheets

(56) References Cited

U.S. PATENT DOCUMENTS

| | | | |
|---|---|---|---|
| 2006/0148512 A1* | 7/2006 | Ekholm et al. | 455/550.1 |
| 2006/0205427 A1* | 9/2006 | Laible et al. | 455/518 |
| 2006/0229094 A1* | 10/2006 | Huh et al. | 455/518 |
| 2006/0234746 A1* | 10/2006 | Bouat | 455/518 |
| 2007/0136475 A1 | 6/2007 | Leppisaari et al. | |
| 2007/0202910 A1* | 8/2007 | Brewer et al. | 455/521 |
| 2007/0281723 A1* | 12/2007 | Chotai et al. | 455/518 |
| 2008/0032728 A1* | 2/2008 | Patel et al. | 455/518 |
| 2008/0247373 A1 | 10/2008 | Synnergren et al. | |
| 2010/0016008 A1 | 1/2010 | Brewer et al. | |
| 2010/0248772 A1* | 9/2010 | Denman et al. | 455/518 |
| 2013/0281147 A1* | 10/2013 | Denman et al. | 455/518 |

OTHER PUBLICATIONS

Rosenberg, J. et al., "SIP: Session Initiation Protocol," Request for Comments (RFC) 3261, Jun. 2002, Internet Engineering Task Force (IETF), Retrieved from the Internet URL: https://www.ietf.org/rfc/rfc3261.txt on Oct. 20, 2014, pp. 1-252.

Schulzrinne, H. et al., "RTP: A Transport Protocol for Real-Time Applications," Request for Comments (RFC) 3550, Jul. 2003, Internet Engineering Task Force, Retrieved from the Internet URL: https://www.ietf.org/rfc/rfc3550.txt on Oct. 20, 2014, pp. 1-98.

* cited by examiner

METHOD AND APPARATUS FOR PROVIDING SESSION INITIATOR PRIVILEGE, PRIORITY AND PRESENCE NOTIFICATION FOR PUSH-TO-TALK CHAT GROUP COMMUNICATIONS

FIELD OF THE DISCLOSURE

The present disclosure relates generally to Push-to-Talk (PTT) chat group communications, and more particularly to procedures for initiating a session having an assigned priority for a PTT chat group and for providing presence and priority notification to members of the PTT chat group.

BACKGROUND

Push-to-talk is a method of conversing on half-duplex communication lines using a button to switch from voice reception mode to transmit mode. In half-duplex communications, only one person transmits at a time, while all other parties to the communications listen. More recently, PTT services are being provided over cellular communications networks. For example, the Open Mobile Alliance (OMA) has developed standards for PTT communication over cellular networks in a suite of published technical specifications (TS) termed herein as OMA Push-to-talk over Cellular (PoC) TSs or OMA PoC standards. One such TS is the OMA PoC Control Plane TS approved version 2.1 dated on Aug. 2, 2011. Among other things, the OMA PoC Control Plane TS describes the use of PTT chat groups (which in the OMA PoC standards are called Chat PoC Groups), and PoC sessions for chat groups (called Chat PoC Group Sessions in the standards).

Implementing PTT half-duplex communications on cellular networks provides certain advantages. Traditional cellular calls require the dialing of a number, network switching and routing, call setup, and waiting for an answer. They also require the use of dual frequencies, one for transmission and one for reception, so that both parties may speak simultaneously; and once the call is established, the connection remains active until the call is ended. PoC sessions have a much quicker protocol due to the immediacy of PTT communication, and because only one party holds the floor at any given time, the entire call can be handled by a single frequency. This allows for network resources to be used only during talk spurts as opposed to the entire duration of the call session. Additionally, PoC also allows for group conferencing without the need for dialing multiple numbers, making it a more cost-effective communication option. The real power of PoC group communication, however, is that it provides for the simultaneous dissemination of information among multiple parties while still maintaining the ability to receive immediate feedback. For most service plans, PoC sessions do not even consume a subscriber's allotted calling minutes.

The modest cost and group capability associated with PoC service has led to its growing popularity as a social networking tool. Anyone may connect with their circle of friends by simply creating a chat group, populating it with contacts, and initiating a call session with the touch of a button. With such success enjoyed in the civilian marketplace, it comes, perhaps, as little surprise that PTT chat groups are increasingly considered for professional, commercial, and public-safety use. Such use, however, has associated with it a different set of requirements which necessitates more robust features for PTT chat groups.

Accordingly, there is a need of a method and apparatus for providing session initiator privilege, priority and presence notification for push-to-talk chat group communications.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
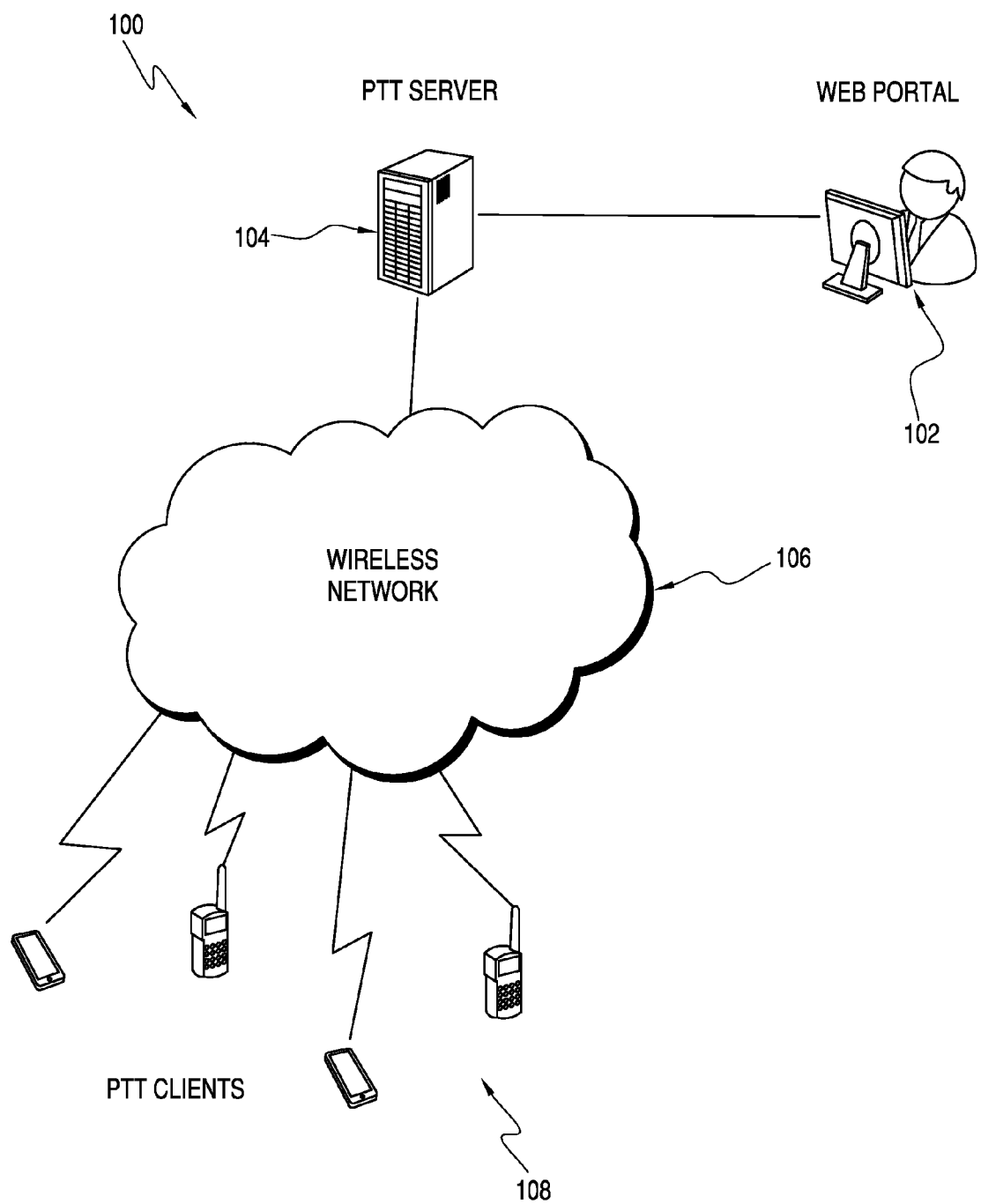
FIG. 1 illustrates a communication system implementing embodiments of the present teachings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and apparatus for providing session initiation privileges, assigning priorities, and providing presence notification for push-to-talk chat group communications. In accordance with the teachings herein, a method for providing presence notification for PTT chat group communications includes a server receiving a session initiation message to start a session for a PTT chat group from a communication device of a first member of the PTT chat group, which comprises a plurality of PTT chat group members in addition to the first member. The server further generates an event notification message that includes an indication that the PTT chat group is active, which is sent to the communication devices of at least some of the other PTT chat group members.

Further in accordance with the teachings herein, a method for managing the priority of a PTT chat group session includes a server associating a group priority with a PTT chat group. The server also receives a message from the communication device of one of the members of the PTT chat group to initiate a session for the PTT chat group with a priority level for the session that is different from the group priority. The server further assigns the group priority to the session over the priority level indicated in the initiation message.

Also in accordance with the teachings herein, is a non-transient computer-readable storage element with computer-readable code stored thereon for programming a computer to perform a method for providing presence notification for PTT chat group communications. The method includes receiving a Session Initiation Protocol (SIP) INVITE message from the communication device of a member of the PTT chat group to start a session for the PTT chat group, wherein the SIP INVITE message includes an indication of a member-selected priority level for the session. The method also includes generating a first SIP NOTIFY message, in response to receiving the SIP INVITE message, which indicates the PTT chat group is active along with the priority level assigned to the session, and sending the first SIP NOTIFY message to the communication devices of at least some of the other members of the PTT chat group. The method further includes determining the session has ended, responsively generating a second SIP NOTIFY message indicating that the PTT chat group is inactive, and sending the second SIP NOTIFY message to a communication device of at least one of the PTT chat group members.

Referring now to the drawings, and in particular FIG. 1, a communication system implementing embodiments in accordance with the present teachings is shown and indicated generally at 100. System 100 comprises a web portal 102, a PTT server 104, a wireless network 106, and PTT client devices 108. Only a limited number of system elements 102, 104, 106 and 108 are shown for ease of illustration, but additional such elements may be included in the communication system 100. Moreover, other components needed for a commercial embodiment of the system 100 are omitted from the drawing for clarity in describing the enclosed embodiments.

In this illustrative implementation, the system elements 102-108 of communication system 100 are configured (i.e., adapted) to operate in compliance with one or more aspects of the OMA PoC standards. However, the teachings herein are applicable to any communication system having a wireless or wireline network 106 that provides for PTT group communications. "PTT group communication" is defined herein as two or more chat group members mutually participating in a chat group session using half-duplex communication whereby the same channel is used for both reception and transmission. Further, the wireless network 106 can use any suitable wireless network technology. Accordingly, network 106 can be, for example, a Global System for Mobile Communications (GSM) network, a Code Division Multiple Access (CDMA) network, or a Wi-Fi network to name but three. Similarly, a wireline network can use any suitable access technology such as broadband.

We now turn to a brief description of the system elements within communication system 100. In general, the web portal 102, PTT server 104, wireless network 106, and PTT client devices 108 are adapted with functionality in accordance with embodiments of the present disclosure as described in detail below with respect to the remaining figures. "Adapted" or "configured" as used herein means that the indicated elements are implemented using one or more (although not shown) memory devices, network interfaces, and/or processing devices that are operatively coupled. The memory devices, network interfaces, and/or processing devices, when programmed, form the means for these system elements to implement their desired functionality.

The network interfaces are used for passing signaling, also referred to herein as messaging (e.g., messages, packets, datagrams, frames, superframes, and the like), containing control information, voice, or non-voice media between the elements of the system 100. The implementation of the network interface in any particular element depends on the particular type of network, i.e., wired and/or wireless, to which the element is connected. For example, the client devices contain wireless interfaces to attach to the wireless network, and there may be wired interfaces between the PTT server 104 and infrastructure devices contained in the wireless network 106. Examples of wired interfaces include Ethernet, T1, USB interfaces, etc., and examples of wireless interfaces include Long Term Evolution (LTE), CDMA, GSM, Wi-Fi, etc.

Where the network supports wireless communications, the network interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware.

The processing devices utilized by the elements of system 100 may be partially implemented in hardware and, thereby, programmed with software or firmware logic or code for performing functionality described by reference to FIGS. 2-6; and/or the processing devices may be completely implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

Turning back again to the detailed description of the system elements, more particularly, the PTT server 104, interchangeably referred to herein as "the server," manages the methods described throughout these teachings for initiating PTT chat group sessions, providing presence notification, assigning priorities, and facilitating the joining of client devices to active chat group sessions. To accomplish this, the server comprises a processing unit, interchangeably referred to herein as a "computer," which may be programmed, for example, via a non-transient computer-readable storage element having computer-readable code stored thereon.

Interfaced to the PTT server 104 is a web portal 102 which provides an administrator with a centralized access point to affect the programming (i.e., provisioning) of the server 104 as it relates to creating PTT chat groups (also simply referred to herein as "chat groups"), designating group priorities, assigning member privileges and other such functionality as described throughout these teachings. The web portal can be any type of computing device such as a personal computer, as shown, that contains a user interface for an administrator. An "administrator," as used herein, means a person who is authorized to access the PTT server 104 and implement the aforementioned programming relating to a chat group. "Chat group members," also referred to herein simply as "members," are those individuals who are authorized to participate in a communication session involving the chat group. The chat group members can also be provisioned by the administrator using the web portal 102.

In an embodiment, the web portal 102 utilizes the Internet to connect with the PTT server 104, and additional elements, such as routers and firewalls (not pictured), are communicatively coupled between the web portal 102 and the PTT server 104. Other means of interfacing with the server 104, such as using an intranet, direct connection, or mobile network are also possible. The administrative connection to the server 104 may even be supported by the same wireless network 106 that connects the individual client devices 108 to the PTT server 104. The wireless network indicated at 106 is PTT-enabled, e.g., OMA PoC-enabled, and provides the infrastructure necessary to support PTT chat group sessions involving the PTT server 104 and the client devices 108. The teachings herein, however, are applicable to any type of media or data that can be communicated over a communications network, which includes, but is not limited to, voice, text, video, and image data.

The PTT client devices 108 are communication devices that support PTT communication of media between the users of the devices when the devices are connected to a PTT-enabled network, such as the one indicated at 106. When a client device is used by a member of a PTT chat group, the client device is termed herein as a "member device." When provisioning the members for particular PTT chat groups, the administrator may also provision on the server 104 one or more client devices used by each member for PTT communications, or such provisioning may be performed in real-time when a member connects the client device to the PTT server to facilitate PTT communications. The client devices include devices commonly referred to in the art as mobile devices, access devices, access terminals, mobile stations, mobile subscriber units, subscriber units, user devices, and the like, which can be any type of communication device such as radios, mobile phones, mobile data terminals, Personal Digital Assistants (PDAs), laptops, two-way radios, cell phones, etc. For purposes of these teachings, PTT client devices are interchangeably referred to as "client devices," "communication devices" and "member devices."

Figure 2:
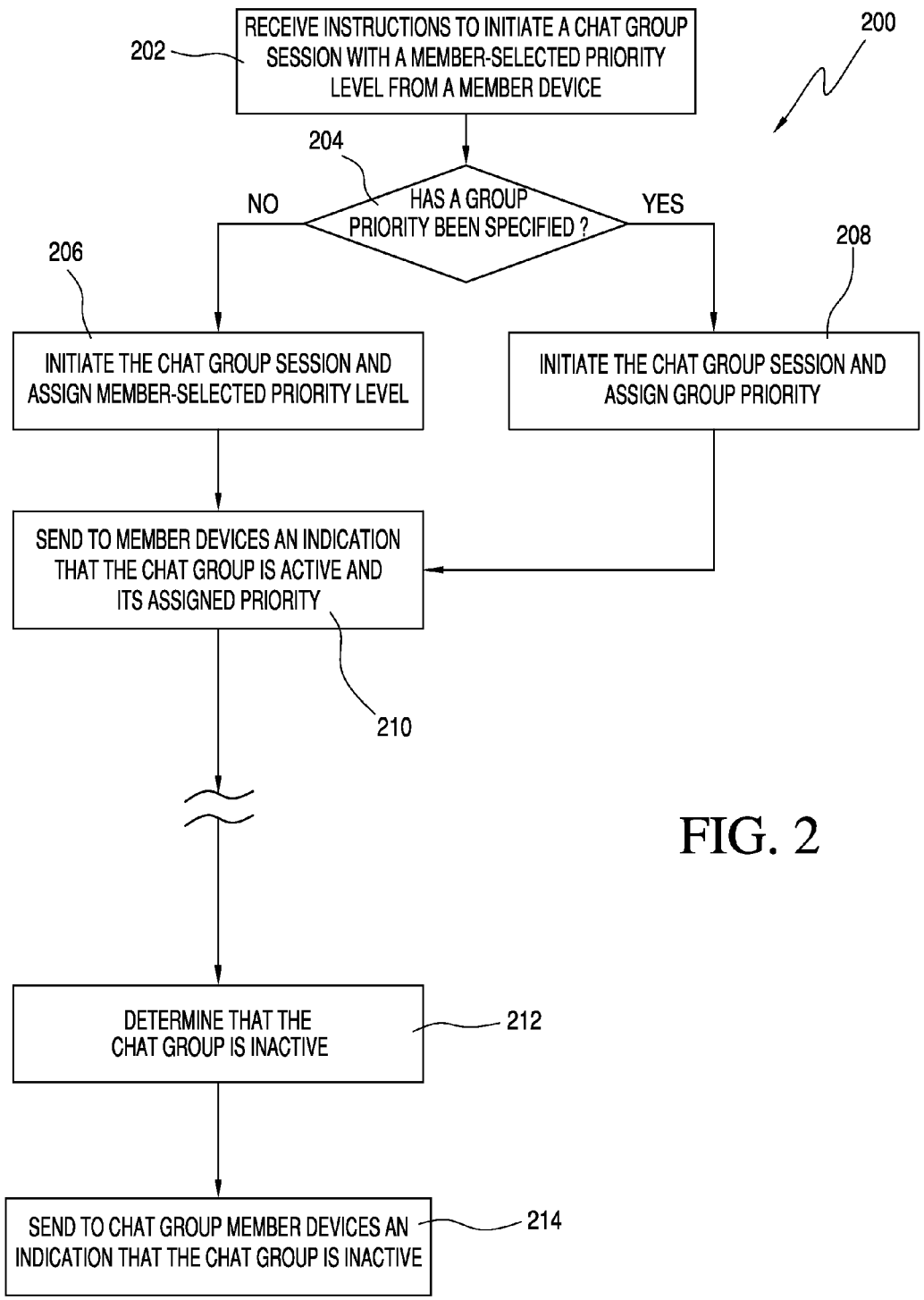
FIG. 2 is a logical flowchart illustrating the initiation of a PTT chat group session with a specified priority and the generation of a presence notification which is communicated to member devices by sending an event notification message, in accordance with some embodiments of the present teachings.

We now turn to a detailed description of the functionality of the system 100 elements in accordance with the teachings herein and by reference to the remaining figures. FIG. 2 is a logical flow diagram illustrating a method 200 performed by the PTT server 104 for establishing a PTT chat group session and providing presence notification to communication devices used by members of the chat group. A "chat group" is defined as a persistent group having a plurality of provisioned members that are authorized to engage in PTT communications during a chat group session. A chat group is different from a traditional PTT talkgroup in that although a session initiation message is used to establish a communication session for the chat group, there is no requirement of forwarding the session initiation message to other members of the group in order for them to join the session. A "presence notification," as used herein, is an indication that the status of a chat group has transitioned from an inactive to an active state (chat group session is present) or from an active to an inactive state (chat group session is no longer present). A "status indication," as used herein, is an indication that a chat group is either active or inactive.

When the administrator provisions a chat group into the PTT server 104, he may also provision the PTT chat group with a "group priority," which becomes an intrinsic property of the PTT chat group. The group priority is thus said to be associated, at or by the PTT server 104, with the PTT chat group itself. The group priority is distinguished from a "member-selected priority," which is a priority assigned to a chat group session by one of the chat group members upon session initiation. More particularly, for each chat group, the administrator specifies two or more members who can participate in sessions involving that chat group. The administrator also determines a subset comprising one or more of those members who are authorized to start (i.e., initiate) sessions for the PTT chat group. These members are termed herein as "initiators" or "initiating members," and may include all or some of the provisioned members of the chat group. Thus, those members not belonging to the subset of initiating members can join active chat group sessions but cannot initiate them. This information may then be pushed by the server 104 to all the member communication devices.

When an authorized member initiates a chat group session, that member may also designate a member-selected priority level to be associated with the session. The member-selected priority, which specifies the importance of a chat group session, is generally chosen from a group of available priority levels. A particular system exemplifying the teachings herein may, for example, be able to distinguish between four different priorities (e.g., low, medium, high, and critical) and take an appropriate action in each case.

More particularly, FIG. 2 shows the PTT server 104 receiving from the communication device of a member with initiation privileges, a session initiation message at 202. The session initiation message represents an instruction to the PTT server 104 that it is to activate a session for a particular chat group with an indicated member-selected priority. Because the member-selected priority is associated with the chat group only while it is active, a different member-selected priority may be specified for each session. By contrast, a group priority, when assigned by an administrator, becomes a fixed property of the chat group and applies to all sessions until such time as the administrator removes it. At 204, the server 104 determines whether a group priority has been assigned for the chat group specified in the session initiation message. Where no group priority has been assigned, the server 104 establishes a chat group session for the chat group and assigns to the session the member-selected priority, at 206. Where the specified chat group has a group priority associated with it, the server 104 preempts the member-selected priority and establishes the session with the group priority, at 208. In effect, the administrator's ability to specify a group priority serves as a type of supervisory override feature.

After establishing the chat group session, the server 104 sends an event notification message to the communication devices of the chat group members, at 210. This message is designed to provide notice to chat group members that the group has transitioned from inactive to active status. This status indication, along with the priority that has been assigned to the session, is communicated to the member devices. Upon receipt of the message, group members are alerted to the fact that there is a chat group session in progress and are made aware of its priority. This allows each group member to make a more-informed decision on whether or not to join the active session. In an embodiment consistent with the present teachings, the event notification message to a client device further carries a priority and status (i.e., active or inactive) indication for all chat groups for which the user of the client device is a member.

Where the communication device 108 of a chat group member is turned off or is beyond the service area of the wireless network 106, the event notification message is queued by the server 104 for later delivery. Upon being turned on or reentering the service area, the communication device 108 is registered with the server 104. "Registration" is the mechanism by which the server 104 records the fact that the communication device 108 is actively connected to the network 106. The server 104 then sends to the communication device 108 a belated event notification message. This later-received notification may also contain status and priority information for additional chat groups that changed their status while the communication device 108 was disconnected from the network 106.

An active PTT chat group session may transition to inactive status in a variety of ways. The close of a chat group session, for example, may be at the request of the initiating member, or result from an inactivity timer failing to detect traffic flow for a predetermined duration of time. In either case, the PTT server 104 determines that the chat group session has ended, at 212, and sends an additional event notification message that communicates this status or presence information to the member devices, at 214. This alerts members that their opportunity to join the chat group has expired.

Figure 3:
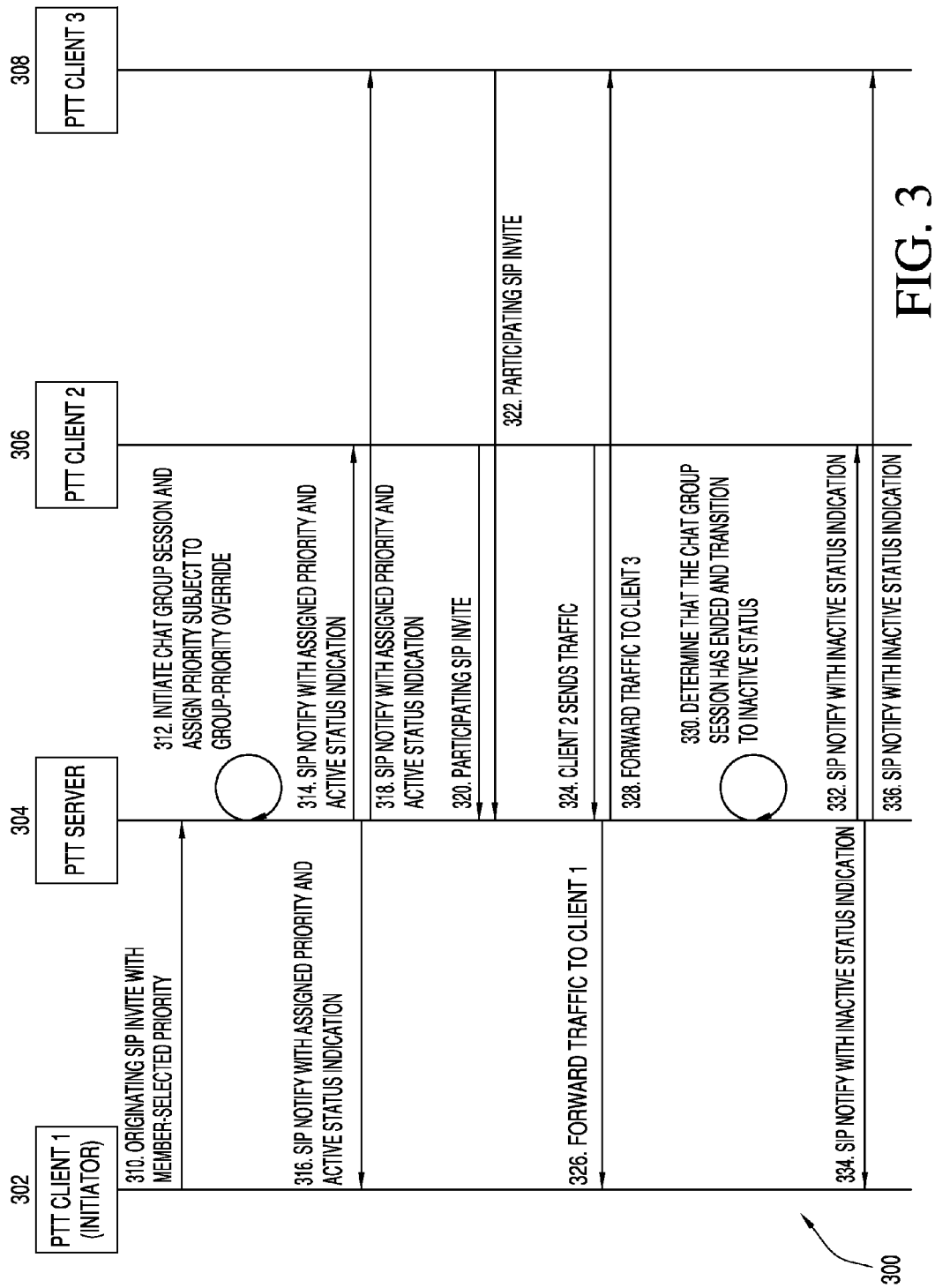
FIG. 3 is a message sequence diagram illustrating the generation and use of presence and priority notifications for a PTT chat group session in accordance with an embodiment of the present teachings.

FIG. 3 is a message sequence diagram illustrating an overview of the setup and takedown of a chat group session in accordance with an embodiment of the present teachings. The system elements displayed in FIG. 3 are a first, second and third PTT client, at 302, 306 and 308 respectively, and a PTT server at 304. The first client 302 is an initiator. Within these described embodiments, an "initiator" is a chat group member belonging to the subset of members who have been granted the privilege to start a chat group session. The second 306 and third 308 PTT clients are members who are authorized to join the chat group session. Each of the second 306 and third 308 PTT clients may also be initiators, but need not be for purposes of these teachings. When it is clear from context, the term "client" and "PTT client" will be used interchangeably herein to refer either to a chat group member or the communication device belonging to that chat group member. Additionally, the PTT server indicated at 304 is not necessarily the same server as indicated in FIG. 1 at 104.

More particularly, FIG. 3 shows the first client 302 initiating a chat group session by sending a session initiation message 310. A "session initiation message" is a message sent by the communication device of a chat group member which utilizes a session management protocol to instruct the server 304 to start a chat group session for the chat group indicated in the message. In this embodiment, the session initiation message is a Session Initiation Protocol (SIP) INVITE message 310 to the PTT server 304. SIP is particular session management protocol defined in Request for Comments (RFC) 3261 dated June 2002 (and any subsequent revisions) as published by the Internet Engineering Task Force (IETF) standards organization and which is widely used to set up, take down, and manage communication sessions. While SIP is indicated for some embodiments within this disclosure, any other suitable session management protocol could also be used to implement these teachings in practice.

The SIP INVITE message 310 contains an indication of the particular chat group for which the session is to be initiated, along with a member-selected priority chosen by the initiator for the session. Upon receiving the SIP INVITE 310, the PTT server 304 starts a session for the chat group, at 312 (upon verifying or determining that the initiator is an authorized initiator as provisioned by the administrator), and assigns to the session one of two priorities. If the administrator specified a group priority at the time the chat group was created, then the server 304 assigns the group priority to the chat group session. Where no group priority is associated with the group, the server 304 assigns the member-selected priority indicated in the SIP INVITE 310 to the session. When the session is active, the server 304 sends event notification messages, in this case SIP NOTIFY messages, 314-318 containing a presence notification that a session for the chat group is active and the assigned priority for the session to all the client devices 302, 306, 308.

The first and second client devices 306, 308 use the information contained in the SIP NOTIFY messages 314, 318 to display the chat group that has just transitioned to active status, along with the assigned priority for the session. Where the users or the client devices decide or determine to join the active session, either in response to user input or as a consequence of the assigned priority as indicated below with reference to FIGS. 5 and 6, the client devices respond to the SIP NOTIFY by sending Participating SIP INVITE messages 320, 322 back to the PTT server 304. This establishes session legs to the session for the responding devices (not shown).

When the participating chat group members have been joined to the chat group session, an additional protocol, such as Real-time Transport Protocol (RTP), as defined in Internet Engineering Task Force (IETF) Request for Comments (RFC) 3550 dated July 2003 (and any subsequent revisions), which defines a standardized packet format for delivering media over IP networks and supports the flow of media traffic between members. Where the second client 306, for example, has been granted floor control (using any suitable floor control protocol), the PTT Client 2 sends media 324 (e.g., voice, text, etc.) that is received by the server 304, which, in turn, forwards (326, 328) the media to the first and third clients 302, 306, respectively. Media is exchanged in this way until the session is terminated.

When the server 304 determines (330) that the chat group session has ended, it sends out an event notification message, which in this embodiment is a SIP NOTIFY message 332-336, to all members of the chat group connected to the network 106, including, in one embodiment, those who did not participate in the session. The SIP NOTIFY messages contain a presence notification alerting the members to the fact that the chat group session is inactive and has, thereby, ended. Notifications for members not connected to the network remain pending until such time as those members register with the server 304, or until some predetermined time for purging such messages. When a member does register with the server 304, the SIP NOTIFY message that member receives contains a current status indication. A "current status indication" means that where delivery of the SIP NOTIFY message is belated, the status indication contained in that message is made current so the correct status is communicated at the time the message is sent.

Figure 4:
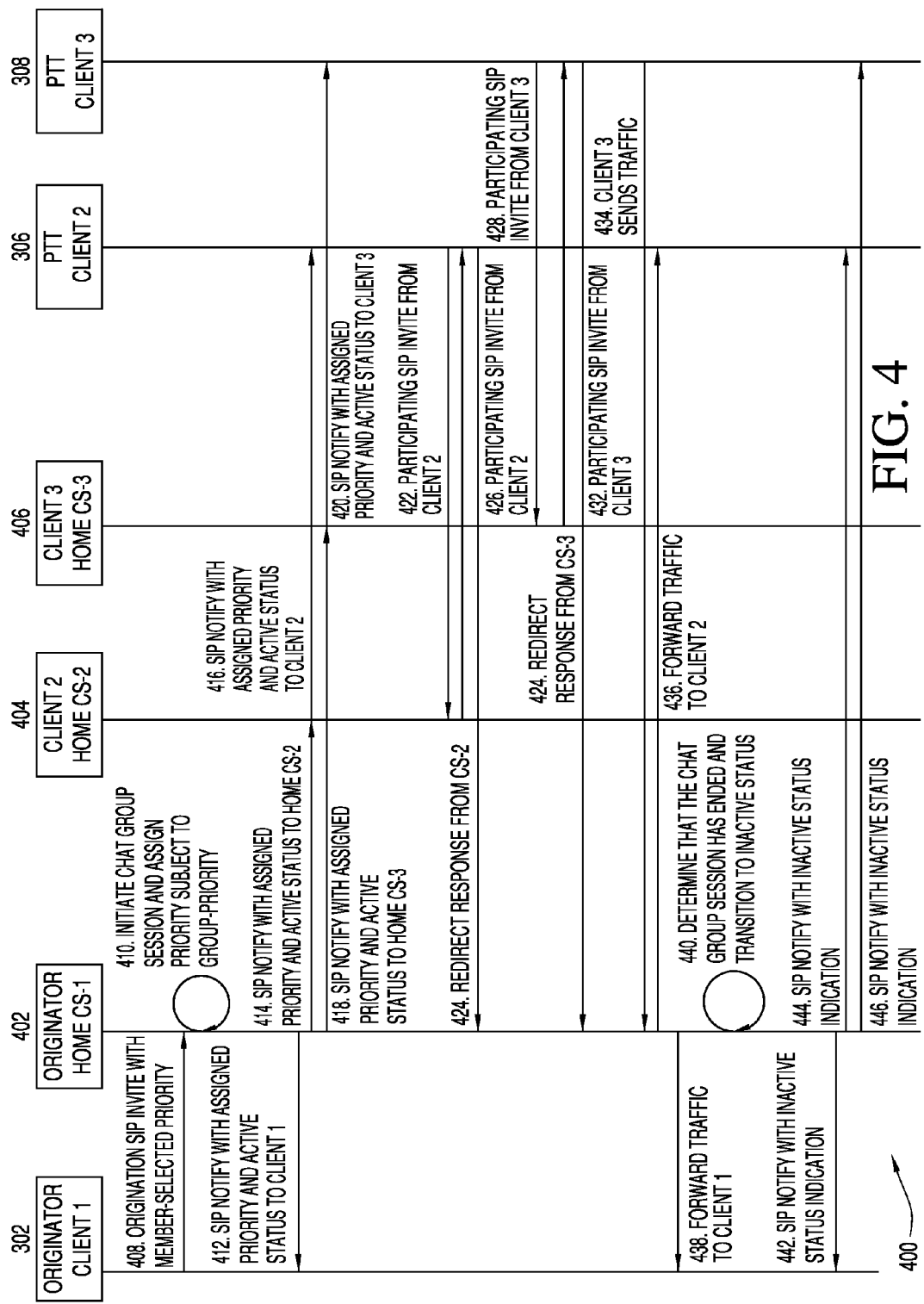
FIG. 4 is a message sequence diagram illustrating the generation and use of presence and priority notifications for a PTT chat group session in accordance with an embodiment of the present teachings.

Turning now to FIG. 4, shown therein is a message sequence diagram illustrating further embodiments for the setup and takedown of a chat group session that involves the use of multiple PTT servers, which are interchangeably referred to herein as "control switches" (CSs). The system elements displayed in FIG. 4 are a first, second and third PTT client, at 302, 306 and 308, where the first PTT client is again the originator of the session, along with their home servers at 402, 404 and 406, respectively. The first, second and third PTT clients are interchangeably referred to herein as "client-1," "client-2" and "client-3," respectively.

More particularly, FIG. 4 shows a SIP INVITE 408, which specifies a particular chat group along with a member-selected priority level, being sent by the originator 302 to its home CS 402. The home CS of the originator (CS-1) 402 starts the chat group session and assigns either the member-selected or group priority, at 410, as described above with reference to FIG. 3. CS-1 sends a SIP NOTIFY message containing a presence notification, of session active, for the chat group session and an indication of the session's assigned priority to both the home CS of the second client (CS-2) and the home CS of the third client (CS-3) at 414 and 418, respectively. CS-1 also sends a SIP NOTIFY message back to the originator at 412. At 416 and 420, CS-2 and CS-3 forward the SIP NOTIFY messages they received to their respective clients.

Client-2 and client-3 signal their intent to join the active chat group session to their home CSs at 422 and 428, respectively, and both receive back a redirect response 424, 430 which indicates that CS-1 402 is hosting the chat group session. Participating SIP INVITE messages 426 and 432 are then sent by client-2 306 and client-3 308, respectively, directly to the hosting server 402. Upon receiving the Participating SIP INVITE messages, CS-1 402 joins client-2 306 and client-3 308 to the chat group session. Where client-3 308 has floor control, for example, client-3 308 sends media traffic 434 to CS-1. From CS-1, the media traffic is forwarded to client-1 302 and client-2 306 at 438 and 436, respectively. When the hosting server 402 determines the chat group session has ended, at 440, it again sends out SIP NOTIFY messages 442-446, to all clients, with a presence notification indicating that the chat group is inactive. Members not connected to the network 106 receive a SIP NOTIFY message upon registering with their home server.

Additionally, it may be noted that each home CS could also function as a back-to-back user agent (B2BUA) or proxy for its respective client. For example, CS-2 404 and CS-3 406, functioning as B2BUAs, may each set up a participating chat group session with CS-1 402 (the controlling CS) after receiving participating SIP INVITES from client-2 306 and client-3 308, at 422 and 428 respectively. Instead of client-2 306 and client-3 308 being redirected to CS-1 402, both CS-2 404 and CS-3 406 become participating CSs for the chat group call. Signaling and media messages are then relayed to and from client-2 306 and client-3 308 via CS-2 404 and CS-3 406 respectively. Alternatively, it might be the case that CS-2 404 and CS-3 406 are not part of the media path, and that only the signaling messages are sent to client-2 306 and client-3 308 via CS-2 404 and CS-3 406.

A further variation on the embodiment depicted in FIG. 4 includes an Active Directory (AD) (not shown) which is a home location directory that stores information about subscribers and their capabilities. In this alternate embodiment, the event notification message generated by the originator's home CS 402 is sent first to the AD which utilizes directory information to push the presence notification and priority information in the event notification message to the home CSs of all member clients. CS-1, CS-2 and CS-3 then each forward a SIP NOTIFY message to their respective clients, as indicated at 412, 416 and 420, and the chat group session progression continues as indicated in FIG. 4 until the chat group session ends. When the hosting CS 402 determines (440) that the chat group session has ended, an event notification message indicating call termination is sent to the AD. The AD forwards the event notification messages to the home CS of each client, which, in turn, send SIP NOTIFY messages to their respective clients. Members not connected to the network 106 receive a belated SIP NOTIFY message when they register with their home servers.

Figure 5:
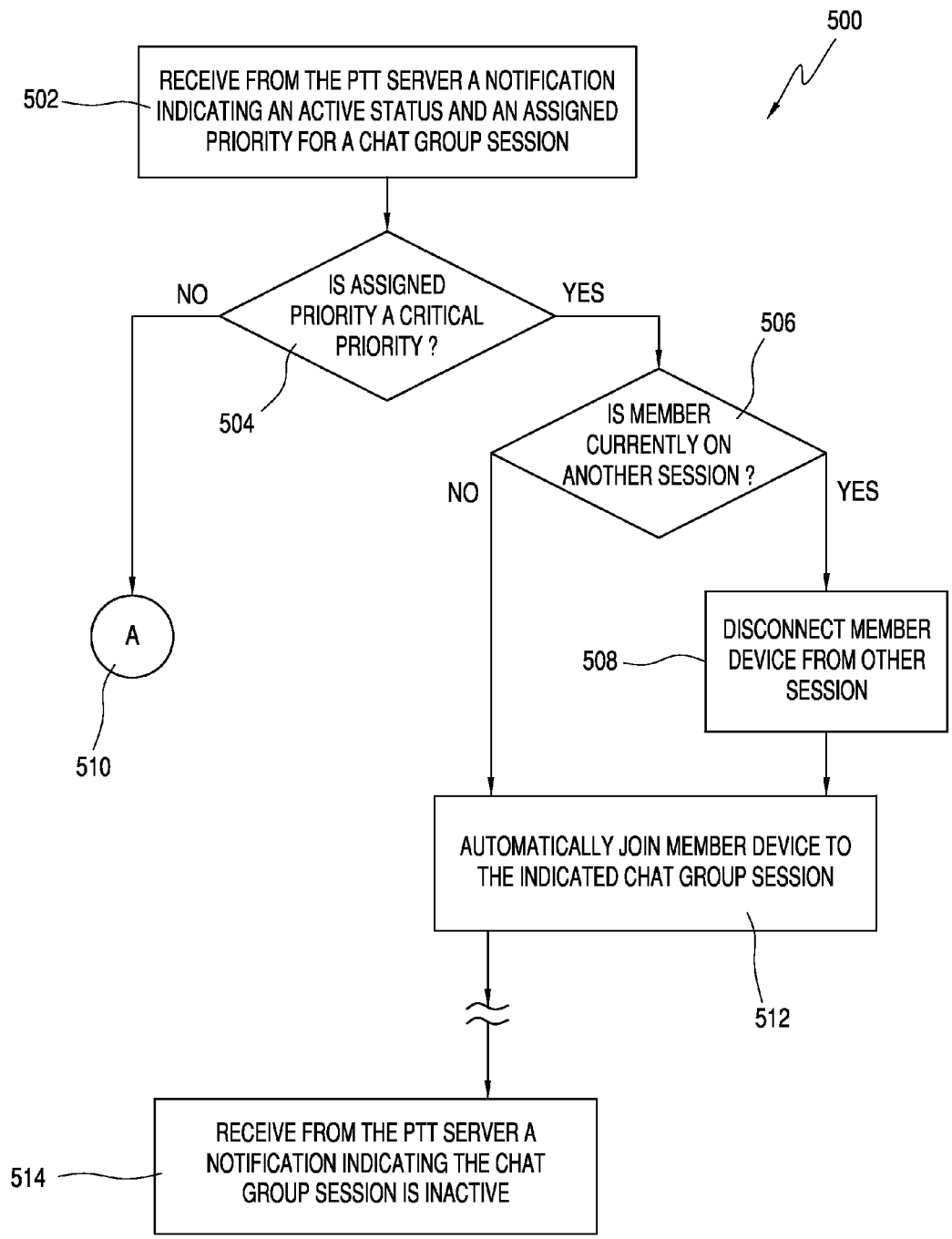
FIG. 5 is a logical flowchart illustrating a method for joining a member device to a PTT chat group session in response to receiving an event notification message, in accordance with an embodiment of the present teachings.

FIG. 5 is a logical flow diagram illustrating a method 500 by which a communication device may be automatically disconnected from an ongoing chat group session and joined to a newly initiated chat group session which has been assigned a "critical" priority. Critical priority is a state of relative importance assigned to a chat group session so that it may be distinguished or singled out from other chat group sessions for special treatment consistent with the teachings herein. The process by which a communication device is automatically connected to an active chat group session in the absence of member input is also referred to herein as "auto-joining." Communication devices are auto-joined to a chat group session assigned a critical priority, as indicated below. A communication device may also be auto-joined to chat group sessions of lower priority, as indicated with reference to FIG. 6, when an auto-join feature is activated on the communication device.

More particularly, FIG. 5 shows a communication device receiving (502) an event notification message which indicates an active status for a PTT chat group, along with the assigned priority for the chat group session. The communication device assesses the priority of the newly initiated chat group session, at 504, and takes the appropriate action. Where the priority is not critical, the member device proceeds (510) to implement the procedure, indicated at 602 with reference to FIG. 6. Where the assigned priority is critical, joining the chat group session is obligatory, and the member device is automatically connected to the session. This involves first ascertaining (506) whether the communication device is connected (i.e., joined) to another chat group session. Where this is the case, the member device is disconnected (508) from the other session (i.e., the session leg is terminated) and then auto joined 512 to the chat group session specified in the event notification message. Communication devices not actively connected to another chat group session are immediately auto joined 512 to the critical chat group session. The critical priority acts as a trigger in that it is the cause which gives rise to a communication device being automatically connected to a chat group session, and also for a non-priority session to be preempted when the client device is participating in a session of lower priority.

In one possible embodiment, the administrator is only capable of assigning a critical group priority, and the member-selected priority is excluded from being a critical priority. In a further embodiment, the group priority assigned by the administrator could be chosen from multiple priorities, including a critical priority, where the member-selected priority is still excluded from being a critical priority. In yet another embodiment, the member-selected priority might be selected from a set of priorities that includes a critical priority. For all possible embodiments, however, the group priority, when specified, is assigned to a chat group session over the member-selected priority. When the chat group session ends, participating member devices leave the session. The PTT server 104 determines that the chat group is inactive and sends another event notification message containing an inactive status indication to all member devices for that group, which is received by the member device, at 514.

Figure 6:
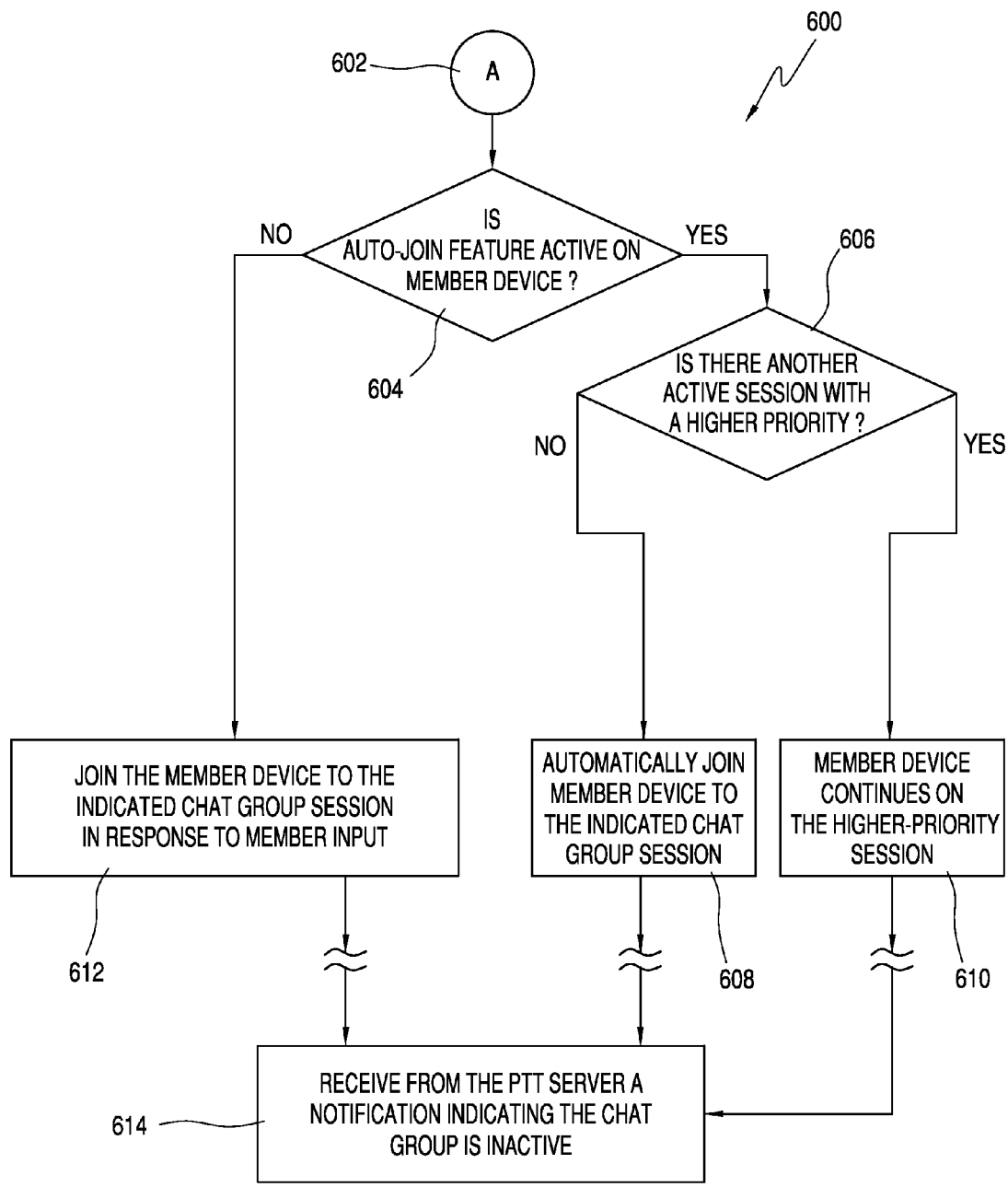
FIG. 6 is a logical flowchart illustrating a method for joining a member device to a PTT chat group session in response to receiving an event notification message, in accordance with an embodiment of the present teachings.

FIG. 6 is a logical flow diagram illustrating a method 600 by which a communication device may be automatically joined to an active chat group session assigned a non-critical priority by means of an auto-join feature activated by a member at a member communication device 108. The auto-join feature distinguishes itself from the auto-join triggered by a critical or group priority, described above with reference to FIG. 5, in that it allows a communication device to automatically connect to sessions of lower priority when the feature is turned on. This includes preemption when the client device is participating in a session of lower priority.

More particularly, FIG. 6 indicates a communication device receiving an event notification message that communicates an active status indication and a non-critical, member-selected priority for a chat group, as continued (602) from 510 in FIG. 5. A determination is made, at 604, as to whether the auto join feature is active on the client device. Where the auto join feature is switched off, the communication device displays the presence notification for the active chat group session along with its assigned priority, and it only joins the indicated chat group session in response to user input directing it to do so, at 612.

Where the auto join feature is switched on, the communication device compares (606) the session priority indicated in the received event notification message with the priorities of all other active chat group sessions that the communication device is authorized to join. Where there is no other active chat group session of higher priority, the communication device automatically joins (608) the indicated chat group session without being prompted by the member. If the client device is participating in a session of lower priority, the lower priority session is preempted in favor of the higher-priority session. The client device leaves the lower-priority session and is joined automatically to the session of higher priority, analogous to the preemption described with respect to critical priority sessions with reference to FIG. 5 (508, 512).

If, when the higher-priority session ends, the lower priority session is still active, the client device is automatically joined back to that session if there is no other active session with a higher priority then active. Where the member device is already participating in a chat group session with higher priority, the communication device remains connected to the higher-priority session, as indicated at 610. When the chat group session ends, the PTT server 104 determines that the session has transitioned from active to inactive status. The inactive status is communicated to all chat group members in the form of an additional event notification message, which is received by the member device, at 614.

As mentioned above, in an embodiment consistent with the present teachings, the event notification message sent to a client device can further carry a status (i.e., active or inactive) indication for all chat groups for which the user of the client device is a member and a member-selected priority for each active PTT chat group. In this case, the event notification message acts as a trigger (when the auto join feature on the member device is enabled) to preemptively join the member device to the PTT chat group with the highest member-selected priority level. The event notification message could include only those PTT chat groups to which a particular user is a member, such that each PTT chat group member receives a custom event notification message. In one implementation, the event notification message with the information for all PTT chat groups is sent only at the time the user registers his member device with the PTT server. Alternatively, each time the status of any of his PTT chat groups changes, the user receives the event notification message with the information for all of his PTT chat groups.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . , a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium (i.e., element) having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for providing presence notification for push-to-talk (PTT) chat group communications, the method comprising a server performing:
   receiving, from a communication device of a first member of a PTT chat group, a session initiation message to start a session for the PTT chat group, wherein the PTT chat group comprises a plurality of PTT chat group members including the first member;
   responsive to receiving the session initiation message, generating a first event notification message that includes an indication that the PTT chat group is active;
   sending the first event notification message to communication devices of at least some of the other PTT chat group members; and wherein the session initiation message is received from the communication device of one of a subset of the plurality of PTT chat group members and wherein only members in the subset are authorized to start a session for the PTT chat group;
   associating a priority level with the PTT chat group, wherein the priority level indicates a priority of the PTT chat group relative to other PTT chat groups; and
   assigning the priority level to the session; and
   conveying the priority level to the other members of the PTT chat group, wherein the conveyed priority level acts as a trigger for the communication devices of the other members of the PTT chat group to auto-join the session.

2. The method of claim 1, wherein the session initiation message is a Session Initiation Protocol (SIP) INVITE message, and the first event notification message is a SIP NOTIFY message.

3. The method of claim 1, wherein the session initiation message includes an indication of a member-selected priority level for the session and wherein the member-selected priority level is selected by the first member from a plurality of priority levels.

4. The method of claim 3 further comprising including the indication of the member-selected priority level in the first event notification message.

5. The method of claim 3 further comprising:
   associating a group priority with the PTT chat group; and
   wherein assigning a priority level comprises assigning the group priority to the session instead of the member-selected priority level.

6. The method of claim 1, wherein assigning the priority level to the session comprises including an indication of the priority level in the first event notification message.

7. The method of claim 6, wherein the priority level acts as a trigger to auto join the communication devices of at least some of the other PTT chat group members to the session.

8. The method of claim 1:
   wherein the first event notification is sent to the communication device of a second member of the PTT chat group;
   wherein the first event notification message further includes a status indication for at least one other PTT chat group for which the second member is a member and includes a priority level for each other active PTT chat group for which the second member is a member; and
   wherein the first event notification message acts as a trigger to preemptively join the communication device of the second member to the active PTT chat group with a highest priority level, when an auto join feature is activated at the communication device of the second member.

9. The method of claim 1, wherein the session initiation message is received from the communication device of one of a subset of the plurality of PTT chat group members, wherein only members in the subset are authorized to start a session for the PTT chat group.

10. The method of claim 1 further comprising the server performing:
    determining that the session has ended, and responsively generating a second event notification message that includes an indication that the PTT chat group is inactive; and
    sending the second event notification message to at least some of the PTT chat group members.

11. A method for managing priority of a push-to-talk (PTT) chat group session, the method comprising a server performing:
    associating, by the server, a group priority with a PTT chat group, wherein the group priority indicates a priority of the PTT chat group relative to other PTT chat groups;
    receiving, by the server from a communication device of one of a plurality of members of the PTT chat group, a first message to initiate a session for the PTT chat group, wherein the first message indicates a priority level, for the PTT chat group session, that is relative to other PTT chat group sessions and that is different from the group priority; and
    assigning, by the server, the group priority to the session instead of the priority level indicated in the initiation message.

12. The method of claim 11, wherein the first message is received from the communication device of an initiating member, wherein the initiating member comprises one of a subset of the plurality of members of the PTT chat group, wherein only the members in the subset are authorized to initiate a session for the PTT chat group, wherein the members of the subset are specified by an administrator.

13. The method of claim 11, wherein assigning the group priority to the session comprises:
    generating a second message that indicates the group priority; and
    sending the second message to communication devices of at least some of the other members of the PTT chat group.

14. The method of claim 13, wherein the second message comprises an event notification message that includes a status indication that the PTT chat group is active.

15. The method of claim 13, wherein the group priority acts as a trigger for the communication devices of the other members of the PTT chat group to auto join the session.

16. The method of claim 13, wherein the first message is a Session Initiation Protocol (SIP) INVITE message, and the second message is a SIP NOTIFY message.

17. A non-transient computer-readable storage element having computer-readable code stored thereon for programming a computer to perform a method for providing presence notification for push-to-talk (PTT) chat group communications, the method comprising:

receiving, from a communication device of a first member of a PTT chat group, a Session Initiation Protocol (SIP) INVITE message to start a session for the PTT chat group, wherein the SIP INVITE message includes an indication of a member-selected priority level for the session, wherein the PTT chat group comprises a plurality of PTT chat group members including the first member and wherein the member-selected priority level indicates a priority of the PTT chat group session relative to other PTT chat group sessions;

responsive to receiving the SIP INVITE message, generating a first SIP NOTIFY message that includes an indication that the PTT chat group is active and an indication of a priority level assigned to the session, wherein the priority level indicates a priority of the PTT chat group session relative to other PTT chat group;

assigning the priority level to the session;

sending the first SIP NOTIFY message to a communication device of at least one of the other PTT chat group members sessions, wherein the priority level assigned to the session acts as a trigger for the communication device of the at least one other member of the PTT chat group to auto-join the session;

determining that the session has ended, and responsively generating a second SIP NOTIFY message that includes an indication that the PTT chat group is inactive; and sending the second SIP NOTIFY message to a communication device of at least one of the PTT chat group members.

18. The non-transient computer-readable storage element of claim 17, wherein the code stored thereon further programs the computer to perform:

registering a communication device;

determining that the registered communication device belongs to a second member of the PTT chat group; and sending a third SIP NOTIFY message to the communication device of the second member, wherein the SIP NOTIFY message includes a current status indication for the PTT chat group.

19. The non-transient computer-readable storage element of claim 17, wherein the code stored thereon further programs the computer to perform:

determining whether a group priority is associated with the PTT chat group;

when a group priority is associated with PTT chat group, indicating the group priority as the priority level assigned to the session;

otherwise, indicating the member-selected priority level as the priority level assigned to the session.

* * * * *

UNITED STATES PATENT AND TRADEMARK OFFICE
CERTIFICATE OF CORRECTION

PATENT NO. : 9,031,598 B2
APPLICATION NO. : 13/332920
DATED : May 12, 2015
INVENTOR(S) : Madhusudan K. Pai et al.

It is certified that error appears in the above-identified patent and that said Letters Patent is hereby corrected as shown below:

IN THE SPECIFICATION:

In Column 8, Line 15, delete "devices 306, 308" and insert -- devices 302, 306 --, therefor.

In Column 8, Lines 38 - 39, delete "clients 302, 306," and insert -- client devices 302, 308, --, therefor.

In Column 1, Line 34, delete "then active." and insert -- than active. --, therefor.

IN THE CLAIMS:

In Claim 7, Column 14, Line 2, delete "auto join" and insert -- auto-join --, therefor.

In Claim 7, Column 14, Line 2, delete "of at the least" and insert -- of the at least --, therefor.

In Claim 8, Column 14, Line 16, delete "auto join" and insert -- auto-join --, therefor.

In Claim 11, Column 14, Line 47, delete "message." and insert -- message; and wherein the first message is received from the communication device of an initiating member, wherein the initiating member comprises one of a subset of the plurality of members of the PTT chat group, and wherein only the members in the subset are authorized to initiate a session for the PTT chat group. --, therefor.

In Claim 12, Column 14, Lines 48-53, delete "11, wherein the first message is received from the communication device of an initiating member, wherein the initiating member comprises one of a subset of the plurality of members of the PTT chat group, wherein only the members in the subset are authorized to initiate a session for the PTT chat group," and insert -- 11, --, therefor.

IN THE CLAIMS:

Signed and Sealed this
Twenty-eighth Day of June, 2016

Michelle K. Lee
*Director of the United States Patent and Trademark Office*

CERTIFICATE OF CORRECTION (continued)
U.S. Pat. No. 9,031,598 B2

In Claim 15, Column 14, Line 67, delete "auto join" and insert -- auto-join --, therefor.

In Claim 16, Column 15, Line 1, delete "claim 13," and insert -- claim 14, --, therefor.